(12) United States Patent
Zhou et al.

(10) Patent No.: US 9,794,818 B2
(45) Date of Patent: Oct. 17, 2017

(54) METHOD FOR ACQUI+RING CHANNEL QUALITY INDICATOR, USER EQUIPMENT, EVOLVED NODE B AND SYSTEM

(71) Applicant: Huawei Technologies Co., Ltd., Shenzhen (CN)

(72) Inventors: Yongxing Zhou, Shenzhen (CN); Jianguo Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 271 days.

(21) Appl. No.: 14/593,423

(22) Filed: Jan. 9, 2015

(65) Prior Publication Data
US 2015/0117249 A1   Apr. 30, 2015

Related U.S. Application Data

(63) Continuation of application No. PCT/CN2012/078435, filed on Jul. 10, 2012.

(51) Int. Cl.
*H04W 24/10* (2009.01)
*H04L 1/00* (2006.01)
(Continued)

(52) U.S. Cl.
CPC ............ *H04W 24/10* (2013.01); *H04L 1/00* (2013.01); *H04L 1/0026* (2013.01);
(Continued)

(58) Field of Classification Search
CPC ..................................................... H04W 24/10
See application file for complete search history.

(56) References Cited

U.S. PATENT DOCUMENTS

2008/0165876 A1* 7/2008 Suh ...................... H04B 7/0408
375/262
2009/0116570 A1 5/2009 Bala et al.
(Continued)

FOREIGN PATENT DOCUMENTS

CN   101868925 A   10/2010
CN   102045142 A   5/2011
(Continued)

*Primary Examiner* — Jason Mattis
(74) *Attorney, Agent, or Firm* — Leydig, Voit & Mayer, Ltd.

(57) ABSTRACT

This application relates to a method for acquiring a CQI, a user equipment, an eNB and a system. The method includes: calculating CQIs of at least two subbands, where there is an overlapped resource block between the subbands; and transmitting the subband CQIs to an eNB. In the method for acquiring a channel quality indicator, the user equipment, the evolved node B and the system of the present application, there is an overlapped resource block between adjacent subbands, and meanwhile the channel quality of the resource block of the subband is obtained by using different subbands, thus the feedback accuracy of the channel quality of the resource block of each subband, especially the channel quality of the resource block in the subband overlapping area, thereby improving the granularity of frequency-selective scheduling, and improving the frequency-selective scheduling and the link adaptation, and therefore, the system throughput is increased.

17 Claims, 5 Drawing Sheets calculating subband channel quality indicators (CQIs) of at least two subbands; where there is an overlapped resource block (RB) between the subbands — 101 transmitting the subband CQIs to an eNB — 102

(51) Int. Cl.
  *H04L 27/26* (2006.01)
  *H04W 24/08* (2009.01)
(52) U.S. Cl.
  CPC ........ *H04L 1/0031* (2013.01); *H04L 27/2627* (2013.01); *H04W 24/08* (2013.01)

(56) References Cited

U.S. PATENT DOCUMENTS

| | | |
|---|---|---|
| 2009/0129284 A1 | 5/2009 | Jung et al. |
| 2009/0154588 A1 | 6/2009 | Chen et al. |
| 2011/0032888 A1* | 2/2011 | Matsumoto ........... H04L 5/0051 370/329 |
| 2011/0134771 A1 | 6/2011 | Chen et al. |
| 2012/0083681 A1* | 4/2012 | Guckenburger ....... A61N 5/103 600/407 |
| 2012/0088455 A1* | 4/2012 | Love ................... H04W 52/243 455/67.11 |
| 2012/0106495 A1* | 5/2012 | Yang ....................... H04L 5/001 370/329 |
| 2014/0204812 A1 | 7/2014 | Li et al. |
| 2015/0237642 A1* | 8/2015 | Ihm ...................... H04L 5/0048 370/329 |

FOREIGN PATENT DOCUMENTS

| | | |
|---|---|---|
| CN | 102064908 A | 5/2011 |
| CN | 102263616 A | 11/2011 |
| CN | 102291752 A | 12/2011 |
| CN | 102461240 A | 5/2012 |
| EP | 2315366 A1 | 10/2009 |

* cited by examiner

METHOD FOR ACQUIRING CHANNEL QUALITY INDICATOR, USER EQUIPMENT, EVOLVED NODE B AND SYSTEM

CROSS-REFERENCE TO RELATED APPLICATIONS

This application is a continuation of International Patent Application No. PCT/CN2012/078435, filed Jul. 10, 2012, which is hereby incorporated by reference in its entirety.

TECHNICAL FIELD

The present invention relates to the field of communications, and more particularly to a method for acquiring a channel quality indicator, a user equipment, an evolved Node B and a system.

BACKGROUND

In a communication system, a channel quality indicator (Channel Quality Indicator, CQI in short) generally describes channel quality during transmission on a specific bandwidth, it can be used for link adaptation and scheduling, and it is crucial for acquiring a channel property and thus improving throughput of the system. In addition, for a system with precoding, the CQI is also calculated based on a precoding matrix, where the precoding matrix is generally indicated by one or more indexes, such as a precoding matrix indicator (Precoding Matrix Indicator, PMI in short) and layer number of a precoding matrix or a rank indication (Rank Indication, RI in short). In the 3rd Generation Partnership Project (The 3rd Generation Partnership Project, 3GPP in short) long term evolution (Long Term Evolution, LTE) system, a user equipment (User Equipment, UE in short) feeds channel state information (Channel State Information, CSI in short) back to an evolved node B (Evolved Node B, eNB in short), where the CSI includes CQI/PMI/RI. In addition, the eNB below may include a macro base station and a low power node, such as a micro base station (Micro), a pico base station (Pico), a remote radio head (Remote Radio Head, RRH), a relay device (Relay) and a femto base station (Femto) and an access point (Access Point).

The existing LTE system feeds back CSI information in different frequency domain granularities. The whole system bandwidth is divided into multiple subbands, where each subband consists of one or more resource blocks (Resource Block, RB in short), CQI/PMI of each subband is calculated and called a subband CQI/PMI; or CQI/PMI of the whole system bandwidth is calculated and called a wideband CQI/PMI. The RI is generally calculated for the whole system bandwidth.

However, in the existing manner of feeding back a subband CQI, subbands indicated by the subband CQIs do not overlap with each other, that is to say, RBs forming one subband are different from RBs forming another subband. The subband CQI is generally acquired by utilizing a signal to interference plus noise ratio (Signal to Interference plus Noise Ratio, SINR in short) on each RB included in the subband, due to channel correlation, the subband CQI will better reflect channel quality of each RB in the center of the subband, and may deviate from channel quality corresponding to an RB on the edge of the subband.

Therefore, in the prior art, the eNB cannot perform frequency-selective scheduling or link adaptation well to an RB on the edge of the subband. Besides, multiple-user pairing in a multiple user-multiple input multiple output (Multiple User-Multiple Input Multiple Output, MU-MIMO) transmission can be further influenced, and thereby reducing system throughput.

SUMMARY

The present application provides a method for acquiring a channel quality indicator, a user equipment, an evolved node B and a system, capable of solving the problem in the prior art that a channel quality indicator of an RB on the edge of a subband cannot be effectively acquired, and improving feedback accuracy of channel quality corresponding to a resource block of each subband, in particular a resource block on the edge of the subband.

One aspect of the present application provides a method for acquiring a channel quality indicator, including:

calculating subband channel quality indicators CQIs, where there is an overlapped resource block between adjacent subbands;

transmitting the subband CQIs to an evolved node B eNB, to enable the eNB to obtain channel quality based on the subband CQIs.

One aspect of the present application further provides a method for acquiring a channel quality indicator, including:

receiving a subband CQI transmitted by a user equipment, where there is an overlapped resource block between adjacent subbands;

obtaining channel quality based on the subband CQI.

Accordingly, another aspect of the present application further provides a user equipment, including:

a calculating unit, configured to calculate subband channel quality indicators CQIs, where there is an overlapped resource block between adjacent subbands;

a transmitting unit, configured to transmit the subband CQIs to an evolved node B eNB, to enable the eNB to obtain channel quality based on the subband CQI.

Accordingly, another aspect of the present application further provides an eNB, including:

a receiving unit, configured to receive a subband CQI transmitted by a user equipment, where there is an overlapped resource block between adjacent subbands;

an acquiring unit, configured to obtain channel quality based on the subband CQI.

Accordingly, still another aspect of the present application further provides a system for acquiring a channel quality indicator, including the eNB and the user equipment described above.

In the method for acquiring a channel quality indicator, the user equipment, the evolved node B and the system of the present application, since there is an overlapped resource block between adjacent subbands when calculating subband CQI, and meanwhile the channel quality of the resource block of the subband is obtained by using different subbands, thus the feedback accuracy of the channel quality of the resource block of each subband, especially the channel quality of the resource block in the subband overlapping area, thereby improving the granularity of frequency-selective scheduling, and improving the frequency-selective scheduling and the link adaptation, and therefore, the system throughput is increased.

DESCRIPTION OF EMBODIMENTS

The technical solution of the present invention will be further described in detail with reference to the accompanying drawings and embodiments.

A UE may feedback a CQI to an eNB in two modes including a periodic mode and a non-periodic mode, and transmit CQI information via a physical uplink control channel (Physical Uplink Control Channel, PUCCH in short) and a physical uplink shared channel (Physical Uplink Shared Channel, PUSCH in short) respectively.

Figure 1:
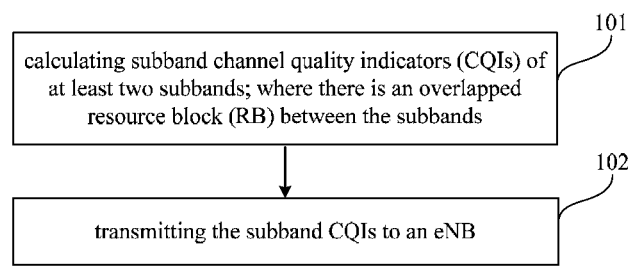
FIG. 1 is a flowchart of a method for acquiring a channel quality indicator according to a first embodiment of the present invention.

FIG. 1 is a flowchart of a method for acquiring a channel quality indicator according to a first embodiment of the present invention, as shown in FIG. 1, the method in this embodiment particularly includes the steps as follows:

Step 101, calculating subband channel quality indicators (CQIs) of at least two subbands; where there is an overlapped resource block (RB) between the subbands;

Preferably, before calculating the subband CQI, a reference signal transmitted by the eNB may be received, and then the subband CQI is calculated based on the reference signal. In addition, the subband CQI is calculated based on the assumption that transmission is performed on the subband.

Specifically, the reference signal transmitted by the eNB may include a channel state information reference signal (channel state information Reference Signal, CSI RS) or a cell-specific reference signal (cell-specific RS, CRS) or a demodulation reference signal (demodulation RS, DM RS). The user equipment UE may obtain resource configuration of the reference signal through receiving a notification from the eNB, such as a radio resource control (Radio Resource Control, RRC in short) signaling or downlink control information (Downlink Control Information, DCI information), or based on a cell identification (ID) and acquire the reference signal on a corresponding resource or subframe.

Specifically, a channel measurement value may be obtained based on the reference signal, such as a CSI RS or a CRS. For example, for an LTE system, a channel measurement value on a resource block (Resource Block, RB in short) or a certain resource element (Resource Element, RE in short) in the RB may be obtained, thus a following system equation may be obtained:

$$y = H_e s + n \qquad (1)$$

where y represents a received signal vector, $H_e$ represents an effective channel matrix, which may be obtained through a channel measurement, s represents a transmitted symbol vector, and n represents interference and measured noise.

The signal to interference plus noise ratio (SINR) or signal to noise ratio (Signal to Noise Ratio, SNR in short), which is generally called SINR, on the resource block (RB) or RE may be obtained based on the equation (1). In terms of a subband consisting of multiple RBs or REs, the signal to interference plus noise ratios (SINR) on the multiple REs or RBs may be obtained. The signal to interference plus noise ratios (SINRs) on the multiple REs or RBs in one subband may be mapped into an effective SNR by utilizing an exponential effective SNR mapping (Exponential Effective SNR Mapping, EESM in short) or a mutual information based effective SNR mapping (Mutual Information based Effective SNR Mapping, MI-ESM in short). A channel quality indicator (CQI) may be obtained based on the quantization of the effective SNR on the subband, for example, the effective SNR in the existing LTE system may be quantified to a 4 bits CQI index. The EESM or the MI-ESM is the prior art, and no further details will be given here. When the CQI is obtained, assume that transmission is performed on the subband.

Specifically, calculating the subband CQI according to transmission performed on the subband may be performed in the following manner assume that transmission is only performed on the subband, and calculate the subband CQI of the subband. Where, performing transmission on the subband may be assuming that a physical downlink shared channel (Physical Downlink Shared Channel, PDSCH in short) transmission is performed on the subband. In addition, it may also be assuming that other traffic channel transmission is performed on the subband. The subband CQI may be used for the traffic channel transmission.

The subband may consist of multiple continuous resource blocks (RBs). Multiple continuous subbands may form a system bandwidth.

Specifically, there is an overlapped resource block (RB) between adjacent subbands, for example, one overlapped RB or two overlapped RBs. For example, the system bandwidth consists of 9 RBs, RBs included in a sunband S1 are, in order, RB1, RB2, RB3, RB4; RBs included in a subband S2 corresponding to the subband CQI are, in order, RB4, RB5, RB6, RB7; RBs included in a subband S3 corresponding to the subband CQI are, in order, RB7, RB8, RB9; where, the same RB included in the subbands S1 and S2 is RB4, and the same RB included in the subbands S2 and S3 is RB7.

Further, step 101 may also include:

calculating a wideband channel quality indicator (CQI) based on the reference signal, where the wideband CQI is calculated based on the assumption that transmission is performed on a system bandwidth;

step 102, transmitting the subband CQIs to an eNB, where the subband CQI may be used for enabling the eNB to obtain channel quality according to the subband CQI.

Specifically, a user equipment UE may transmit the subband CQI to the eNB via a physical uplink control channel (Physical Uplink Control Channel, PUCCH in short) or a physical uplink shared channel (Physical Uplink Shared Channel, PUSCH in short).

Further, step 102 may also include:

transmitting the wideband CQI to the eNB;

at this time, the transmitting the subband CQI to the eNB may specifically be: transmitting differential encoding of the subband CQI relative to the wideband CQI to the eNB.

The eNB obtains channel quality, such as an SINR or a modulation order or an encoding means or a code rate or a transport block size or a combination thereof, based on the subband CQI or the wideband CQI and the differential encoding of the subband CQI relative to the wideband CQI, as described in step 202 in the second embodiment.

In the method for acquiring the channel quality indicator according to embodiments of the present invention, there is an overlapped resource block between adjacent subbands, and meanwhile the channel quality of the resource block of the subband, especially the channel quality of the resource block in the overlapped area of the subband, is obtained by using different subbands, thus the feedback accuracy of the channel quality of the resource block of each subband, especially the channel quality of the resource block in the subband overlapping area, thereby improving the granularity of frequency-selective scheduling, and improving the frequency-selective scheduling and the link adaptation, and therefore, the system throughput is increased. The differential encoding of the subband CQI relative to the wideband CQI can further reduce feedback overhead.

Figure 2:
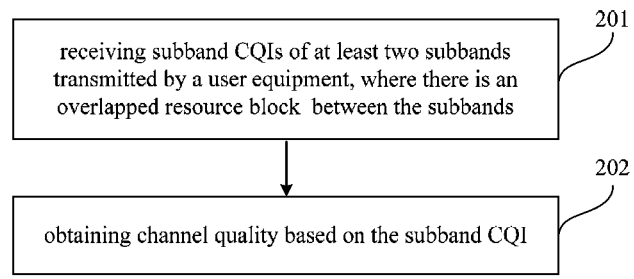
FIG. 2 is a flowchart of a method for acquiring a channel quality indicator according to a second embodiment of the present invention.

FIG. 2 is a flowchart of a method for acquiring a channel quality indicator according to a second embodiment of the present invention, as shown in FIG. 2, the method in this embodiment particularly includes the steps as follows:

step 201, receiving subband CQIs of at least two subbands transmitted by a user equipment, where there is an overlapped resource block (RB) between the subbands;

step 202, obtaining channel quality based on the subband CQI.

In a preferable implementation of embodiments of the present invention, step 202 may be implemented in the following manner obtain channel quality of the overlapped resource block based on the subband CQI of a first subband and the subband CQI of a second subband, if the overlapped resource block is located in the first subband and the second subband of at least two subbands. For example, obtain first channel quality information of the overlapped resource block and second channel quality information of the overlapped resource block respectively according to the subband CQI of the first subband and the subband CQI of the second subband, and select one of the first channel quality information and the second channel quality information to be channel quality of the overlapped resource block.

Preferably, the obtaining the channel quality of the overlapped resource block based on the subband CQI of the first subband and the subband CQI of the second subband may also be implemented in the following manner there is a certain functional relationship among the subband CQI of the first subband, the subband CQI of the second subband and the channel quality of the overlapped resource block, calculate the channel quality of the overlapped resource block based on the functional relationship.

For example, step 202 may be implemented in the following manner obtain the first channel quality information of the overlapped resource block according to the subband CQI of the first subband; obtain the second channel quality information of the overlapped resource block according to the subband CQI of the second subband; and obtain channel quality of the overlapped resource block by averaging the first channel quality information and the second channel quality information.

Preferably, before receiving the subband CQI transmitted by the user equipment, a reference signal may be transmitted to the user equipment, to enabling the user equipment to calculate the subband CQI based on the reference signal. Where, the subband CQI is calculated by assuming that transmission is performed on the subband.

Specifically, the reference signal transmitted by the eNB may include a CSI RS or a CRS or a DM RS. The eNB may notify the user equipment of the transmitted reference signal via a signaling such as an RRC signaling or downlink control information (DCI), or transmit the reference signal on a resource of the reference signal based on the cell identification (ID).

The user equipment calculates the subband CQI based on the reference signal, as described in the first embodiment.

Specifically, the eNB may receive the subband CQI transmitted by the user equipment (UE) via a physical uplink control channel (Physical Uplink Control Channel, PUCCH in short) or a physical uplink shared channel (Physical Uplink Shared Channel, PUSCH in short).

Further, the step 202 may also include receiving a wideband CQI transmitted by the user equipment; at this time, the receiving the subband CQI transmitted by the user equipment may specifically be: receiving differential encoding of the subband CQI relative to the wideband CQI transmitted by the user equipment. The eNB may obtain the subband CQI based on predefined differential encoding, by utilizing the received wideband CQI and the received differential encoding of the subband CQI relative to the wideband CQI. The differential encoding can make full use of frequency domain relevance of the channel, thereby reducing feedback overhead.

Specifically, the obtaining the channel quality based on the subband CQI by the eNB, may be: obtaining, by the eNB, an effective SNR estimation of each subband according to the subband CQI by utilizing an effective SNR quantitative threshold. According to the effective SNR estimation of each subband, obtain an effective SNR estimation of the overlapped RB of each subband by utilizing a linear average or a weighted average or other mapping method; the effective SNR of the non-overlapped RB of each subband may be obtained based on the effective SNR estimation of the subband to which the non-overlapped RB belongs, or may be obtained based on the effective SNR estimation of the overlapped RB or the effective SNR estimation of the subband through an interpolation, or a linear average or a weighted average or other mapping method.

Further, after obtaining the effective SNR estimation based on the subband CQI, obtain a modulation order, an encoding mode, or a code rate corresponding to the effective SNR estimation, by utilizing a specific modulation and encoding means or link performance of code rate, such as a curve between SNRs and block error rates (Block Error Rate, BLER in short) or bit error rates (Bit Error Rate, BER in short).

Further, after acquiring the modulation order, the encoding mode, or the code rate corresponding to the effective SNR estimation, the transport block size may be further obtained based on the number of the RB used by the transmission.

The subband may consist of multiple continuous resource blocks (RBs). Multiple continuous subbands may form a system bandwidth.

Specifically, there is an overlapped resource block (RB) between adjacent subbands, for example, one overlapped RB or two overlapped RBs. For example, the system bandwidth consists of 9 RBs, RBs included in a sunband S1 are, in order, RB1, RB2, RB3, RB4; RBs included in a subband S2 corresponding to the subband CQI are, in order, RB4, RB5, RB6, RB7; RBs included in a subband S3 corresponding to the subband CQI are, in order, RB7, RB8, RB9; where, the same RB included in the subbands S1 and S2 is RB4, and the same RB included in the subbands S2 and S3 is RB7.

In the method for acquiring the channel quality indicator of the embodiments of the present invention, there is an overlapped resource block (RB) between adjacent subbands, and meanwhile the channel quality of the resource block of the subband, especially the channel quality of the resource block in the overlapped area of the subband, is obtained by using different subbands, thus the feedback accuracy of the channel quality of the resource block of each subband, especially the channel quality of the resource block in the subband overlapping area, thereby improving the granularity of frequency-selective scheduling, and improving the frequency-selective scheduling and the link adaptation, and therefore, the system throughput is increased.

Figure 3:
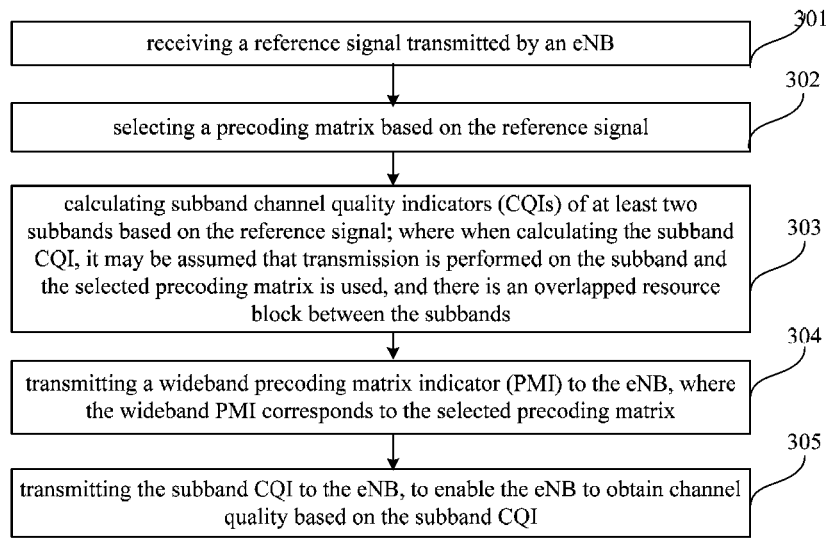
FIG. 3 is a flowchart of a method for acquiring a channel quality indicator according to a third embodiment of the present invention.

FIG. 3 is a flowchart of a method for acquiring a channel quality indicator according to a third embodiment of the present invention, as shown in FIG. 3, the method in this embodiment particularly includes the steps as follows:

step 301, receiving a reference signal transmitted by an eNB.

Specifically, the reference signal transmitted by the eNB may include a CSI RS or a CRS or a DM RS. The user equipment (UE) may obtain the reference signal through receiving the notification (such as RRC signaling or downlink control information (DCI)) from the eNB or based on a cell identification (ID).

Specifically, the eNB may include a common base station, a relay, a transmitting point, an access point or a receiving point, and etc.

Step 302, selecting a precoding matrix based on the reference signal, assuming that transmission is performed on a system bandwidth;

Specifically, a channel measurement value may be obtained based on the reference signal such as a CSI RS or a CRS. For example, for an LTE system, a channel measurement value on a resource block (Resource Block, RB in short) or a certain resource element (Resource Element, RE in short) in the RB may be obtained, thus a precoding system equation can be obtained:

$$y=HPs+n \quad (2)$$

Where y represents a received signal vector, H represents a channel matrix, which may be obtained by a channel measurement, S represents a transmitted symbol vector, and n represents interference and measured noise. Based on the equation described above, by utilizing a predetermined criterion such as maximizing capacity or throughput criterion, a precoding matrix may be selected from a codebook, such as LTE R8 or R10 or a codebook of a future system, when selecting the precoding matrix, it is assumed that transmission is performed on the whole system bandwidth, and the same precoding matrix is used on each RB of the whole system bandwidth.

Specifically, the assuming that transmission is performed on the system bandwidth may be: assuming that a physical downlink shared channel (Physical Downlink Shared Channel, PDSCH in short) transmission is performed on the system bandwidth. In addition, it may also be assuming that other traffic channel transmission is performed on the subband.

Step 303, calculating subband channel quality indicators (CQIs) of at least two subbands based on the reference signal; where when calculating the subband CQI, it may be assumed that transmission is performed on the subband and the selected precoding matrix is used, and there is an overlapped resource block between the subbands.

Specifically, based on the equation (2) and setting that the precoding matrix P in the equation (2) uses the selected precoding matrix, a signal to interference plus noise ratio (SINR) on the resource block (RB) or RE may be obtained. The method for obtaining the subband CQI based on the SINR on multiple REs or RBs is similar to the first embodiment and no details will be given here. The subband may consist of multiple continuous resource blocks (RBs). Multiple continuous subbands may form a system bandwidth.

Specifically, the assuming that transmission is performed on the subband and setting that the selected precoding matrix is used, may be: assuming that a physical downlink shared channel (Physical Downlink Shared Channel, PDSCH in short) transmission is performed on the subband and setting that the selected precoding matrix is used. In addition, it may also be assuming that other traffic channel transmission is performed on the subband. The subband CQI is used for other traffic channel transmission.

Specifically, there is an overlapped resource block (RB), i.e., the same RB between adjacent subbands. For example, one overlapped RB or two overlapped RBs. For example, the system bandwidth consists of 9 RBs, RBs included in a sunband S1 are, in order, RB1, RB2, RB3, RB4; RBs included in a subband S2 are, in order, RB4, RB5, RB6, RB7; RBs included in a subband S3 are, in order, RB7, RB8, RB9; where, the same RB included in the subbands S1 and S2 is RB4, and the same RB included in the subbands S2 and S3 is RB7.

Further, step 303 may also include:

calculating a wideband channel quality indicator (CQI) based on the reference signal; when calculating the wideband CQI, assuming that the selected precoding matrix is used on the system bandwidth and transmission is performed on the system bandwidth.

Specifically, based on the equation (2) and assuming that the precoding matrix P in the equation (2) uses the selected precoding matrix on the system bandwidth, a signal to interference plus noise ratio (SINR) on each resource block (RB) or RE of the system bandwidth may be obtained. The method for obtaining the wideband CQI based on the SINR on the multiple REs or RBs of the system bandwidth by utilizing the EESM or the MI-ESM method and the quantization of the effective SNR, is similar to the first embodiment and no details will be given here.

Step 304, transmitting a wideband precoding matrix indicator (PMI) to the eNB, where the wideband PMI corresponds to the selected precoding matrix.

Step 305, transmitting the subband CQI to the eNB, to enable the eNB to obtain channel quality based on the subband CQI.

Further, step 305 may also include:

transmitting the wideband CQI to the eNB;

at this time, the transmitting the subband CQI to the eNB may specifically be: transmitting differential encoding of the subband CQI relative to the wideband CQI to the eNB.

The eNB obtains channel quality, such as SINR or modulation order or an encoding means or a code rate or a transport block size or a combination thereof, based on the subband CQI or the wideband CQI and the differential encoding of the subband CQI relative to the wideband CQI, as described in step 202 in the second embodiment. The differential encoding can make full use of frequency domain relevance of the channel, thereby reducing feedback overhead.

Specifically, in step 304 and step 305, the user equipment (UE) may transmit a wideband PMI, a subband CQI or a wideband CQI and differential encoding of the subband CQI relative to the wideband CQI to the eNB via a PUCCH or a PUSCH. The wideband PMI, the subband CQI or the wideband CQI and the differential encoding of the subband CQI relative to the wideband CQI may be transmitted on the same or different subframes.

In the method for acquiring the channel quality indicator of the embodiments of the present invention, there is an overlapped resource block (RB) between adjacent subbands, and meanwhile the channel quality of the resource block of the subband, especially the channel quality of the resource block in the overlapped area of the subband, is obtained by using different subbands, thus the feedback accuracy of the channel quality of the resource block of each subband, especially the channel quality of the resource block in the subband overlapping area, thereby improving the granularity of frequency-selective scheduling, and improving the frequency-selective scheduling and the link adaptation, and therefore, the system throughput is increased.

Figure 4:
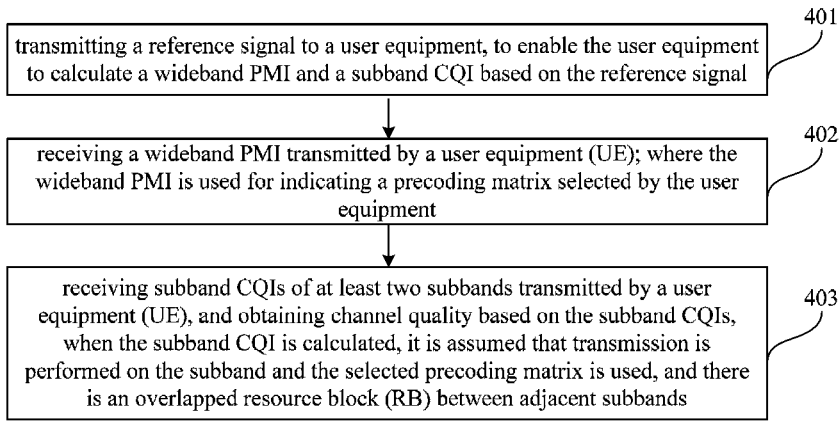
FIG. 4 is a flowchart of a method for acquiring a channel quality indicator according to a fourth embodiment of the present invention.

FIG. 4 is a flowchart of a method for acquiring a channel quality indicator according to a fourth embodiment of the present invention, as shown in FIG. 4, the method in this embodiment particularly includes the steps as follows:

step 401, transmitting a reference signal to a user equipment, to enable the user equipment to calculate a wideband PMI and a subband CQI based on the reference signal.

Specifically, the reference signal transmitted by the eNB may include a CSI RS or a CRS or a DM RS. The eNB may notify the user equipment of the transmitted reference signal via signaling such as an RRC signaling or downlink control information (DCI), or transmit the reference signal on a resource of the reference signal based on the cell identification (ID).

The user equipment calculates the wideband PMI and the subband CQI based on the reference signal, as described in the third embodiment.

Further, the reference signal may also be used for enabling the user equipment to calculate the subband CQI based on the reference signal, as described in the third embodiment.

Step 402, receiving a wideband PMI transmitted by a user equipment (UE); where the wideband PMI is used for indicating a precoding matrix selected by the user equipment, and the precoding matrix is selected based on the reference signal and on the assumption that transmission is performed on the system bandwidth.

Specifically, the wideband PMI may include one or more index values.

Step 403, receiving subband CQIs of at least two subbands transmitted by a user equipment (UE), and obtaining channel quality based on the subband CQIs, when the subband CQI is calculated, it is assumed that transmission is performed on the subband and the selected precoding matrix is used, and there is an overlapped resource block (RB) between adjacent subbands.

Further, the step 403 may also include receiving the wideband CQI transmitted by the user equipment; at this time, the receiving the subband CQI transmitted by the user equipment may specifically be: receiving differential encoding of the subband CQI relative to the wideband CQI transmitted by the user equipment. The eNB can obtain the subband CQI based on the predefined differential encoding by utilizing the received wideband CQI and the received differential encoding of the subband CQI relative to the wideband CQI.

The eNB obtains channel quality, such as SINR or a modulation order or an encoding mode or a code rate or a transport block size or a combination thereof, according to the subband CQI or the wideband CQI and the differential encoding of the subband CQI relative to the wideband CQI, as described in step 202 in the second embodiment. The differential encoding can make full use of frequency domain relevance of the channel, thereby reducing feedback overhead.

Specifically, there is an overlapped resource block (RB) between adjacent subbands. For example, RBs included in a sunband S1 corresponding to subband CQI1 are, in order, RB1, RB2, RB3, RB4; RBs included in a subband S2 corresponding to subband CQI2 are, in order, RB4, RB5, RB6, RB7; based on subband CQI1, the eNB can acquire SINR1 of RB1, RB2, RB3 and RB4 based on the mapping between SINR and CQI, and based on subband CQI2, the eNB can acquire SINR2 of RB4, RB5, RB6 and RB7 based on the mapping between SINR and CQI. There is an overlapped RB, i.e., RB4 between subbands corresponding to subband CQI1 and subband CQI2, the eNB can acquire a more accurate SINR3 of RB4 based on SINR 1 and SINR2, for example, SINR3=(SINR1+SINR2)/2, then SINR3 corresponding to RB4 has a higher accuracy than SINR1 and SINR2. Meanwhile, RB4 has an SINR value which is different from that of RB1, RB2, RB3, also different from that of RB5, RB6, RB7, thereby increasing the granularity of frequency selectivity scheduling.

Specifically, in step 402 and step 403, the eNB can receive a wideband PMI, a subband CQI or a wideband CQI and differential encoding of the subband CQI relative to the wideband CQI transmitted by a user equipment UE through receiving a PUCCH or a PUSCH channel. The wideband PMI, the subband CQI or the wideband CQI and the differential encoding of the subband CQI relative to the wideband CQI may be received on the same or different subframes.

In the method for acquiring the channel quality indicator according to embodiments of the present invention, there is an overlapped resource block between adjacent subbands, and meanwhile the channel quality of the resource block of the subband, especially the channel quality of the resource block in the overlapped area of the subband, is obtained by using different subbands, thus the feedback accuracy of the channel quality of the resource block of each subband, especially the channel quality of the resource block in the subband overlapping area, thereby improving the granularity of frequency-selective scheduling, and improving the frequency-selective scheduling and the link adaptation, and therefore, the system throughput is increased.

Figure 5:
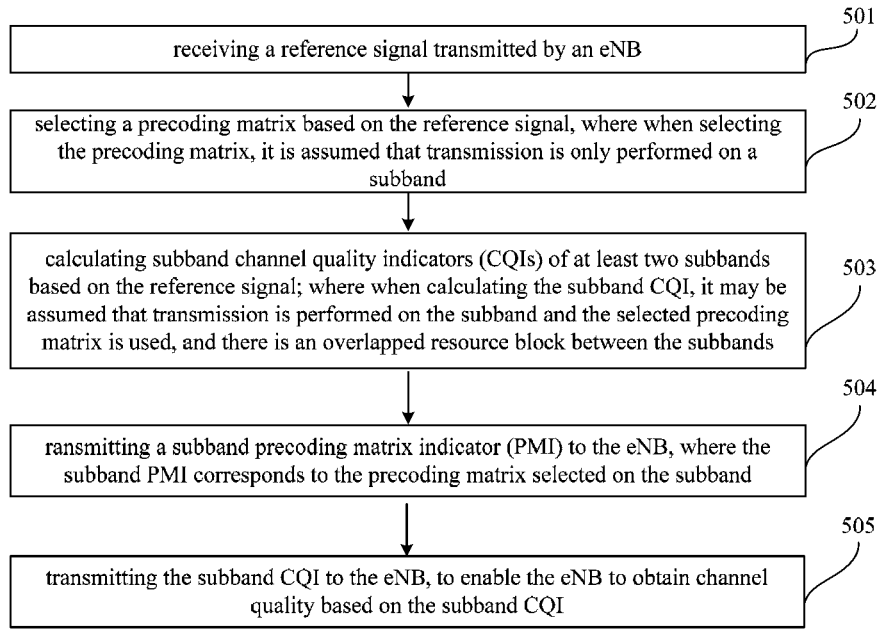
FIG. 5 is a flowchart of a method for acquiring a channel quality indicator according to a fifth embodiment of the present invention.

FIG. 5 is a flowchart of a method for acquiring a channel quality indicator according to a fifth embodiment of the present invention, as shown in FIG. 5, the method in this embodiment particularly includes the steps as follows:

step 501, receiving a reference signal transmitted by an eNB.

Specifically, the eNB includes a common base station, a relay, a transmitting point, an access point or a receiving point, and etc.

Specifically, the reference signal transmitted by the eNB may include a CSI RS or a CRS or a DM RS. The user equipment (UE) may obtain the reference signal through receiving the notification such as RRC signaling or downlink control information (DCI) from the eNB or based on a cell identification (ID).

Step 502, selecting a precoding matrix based on the reference signal, where when selecting the precoding matrix, it is assumed that transmission is only performed on a subband.

Specifically, a channel measurement value may be obtained based on the reference signal, such as a CSI RS or a CRS. For example, for an LTE system, a channel measurement value on a resource block (RB) or a certain resource element (RE) in the RB may be obtained, thus a precoding system equation can be obtained:

$$y=HPs+n \qquad (3)$$

Where y represents a received signal vector, H represents a channel matrix, which can be obtained by a channel measurement, s represents a transmitted symbol vector, and n represents interference and measured noise. Based on the equation described above, by utilizing a predetermined criterion such as maximizing capacity or throughput criterion, a precoding matrix may be selected from a codebook, such as LTE R8 or R10 or a codebook of a future system, when selecting the precoding matrix, it is assumed that transmission is only performed on a subband, and the same the precoding matrix is used on each RB of the subband.

Specifically, the assuming that transmission is only performed on a subband when selecting the precoding matrix, may specifically be: assuming that a physical downlink shared channel (Physical Downlink Shared Channel, PDSCH) transmission is performed on the subband and assuming that the selected precoding matrix is used. In addition, it may also be assuming that other traffic channel transmission is performed on the subband.

Further, a precoding matrix may be selected for each subband in the system respectively, or a precoding matrix may be selected for one or more subbands predefined or selected by a user equipment respectively.

Step 503, calculating subband channel quality indicators (CQIs) of at least two subbands based on the reference signal; where when calculating the subband CQI, it may be assumed that transmission is performed on the subband and the selected precoding matrix is used, and there is an overlapped resource block between the subbands.

Specifically, based on the equation (3) and setting that the precoding matrix P in the equation (3) uses the selected precoding matrix, a signal to interference plus noise ratio (SINR) on the resource block (RB) or RE may be obtained. The method for obtaining the subband CQI based on the SINR on multiple REs or RBs is similar to the first embodiment and no details will be given here. The subband may consist of multiple continuous resource blocks (RBs). Multiple continuous subbands may form a system bandwidth.

Specifically, the assuming that transmission is performed on a subband and assuming that the selected precoding matrix is used when calculating a subband CQI, may be: assuming that a physical downlink shared channel (Physical Downlink Shared Channel, PDSCH in short) transmission is performed on the subband and setting that the selected precoding matrix is used. In addition, it may also be assuming that other traffic channel transmission is performed on the subband. The subband CQI is used for other traffic channel transmission.

Specifically, there is an overlapped resource block (RB), i.e., the same RB between adjacent subbands. For example, one overlapped RB or two overlapped RBs. For example, the system bandwidth consists of 9 RBs, RBs included in a sunband S1 are, in order, RB1, RB2, RB3, RB4; RBs included in a subband S2 are, in order, RB4, RB5, RB6, RB7; RBs included in a subband S3 are, in order, RB7, RB8, RB9. The same RB included in the subbands S1 and S2 is RB4, and the same RB included in the subbands S2 and S3 is RB7.

Further, step 503 may also include:

calculating a wideband channel quality indicator (CQI) based on the reference signal; when calculating the wideband CQI, assuming that the corresponding selected precoding matrix is used on each subband and transmission is performed on the system bandwidth.

Specifically, based on the equation (3) and assuming that the precoding matrix P in the equation (3) uses the corresponding selected precoding matrix on each subband, a signal to interference plus noise ratio (SINR) on each resource block (RB) or RE of the system bandwidth may be obtained. The method for obtaining the wideband CQI based on the SINR on the multiple REs or RBs of the system bandwidth by utilizing the EESM or the MI-ESM method and the quantization of the effective SNR, is similar to the first embodiment and no details will be given here.

Step 504, transmitting a subband precoding matrix indicator (PMI) to the eNB, where the subband PMI corresponds to the precoding matrix selected on the subband.

Step 505, transmitting the subband CQI to the eNB, to enable the eNB to obtain channel quality based on the subband CQI.

Further, step 505 may also include:

transmitting the wideband CQI to the eNB;

at this time, the transmitting the subband CQI to the eNB particularly is: transmitting differential encoding of the subband CQI relative to the wideband CQI to the eNB.

The eNB obtains channel quality, such as SINR or a modulation order or an encoding means or a code rate or a transport block size or a combination thereof, based on the subband CQI or the wideband CQI and the differential encoding of the subband CQI relative to the wideband CQI, as described in step 202 in the second embodiment. The differential encoding can make full use of frequency domain relevance of the channel, thereby reducing feedback overhead.

Specifically, in step 304 and step 305, the user equipment (UE) may transmit a wideband PMI, a subband CQI or a wideband CQI and differential encoding of the subband CQI relative to the wideband CQI to the eNB via a PUCCH or a PUSCH. The wideband PMI, the subband CQI or the wideband CQI and the differential encoding of the subband CQI relative to the wideband CQI may be transmitted on the same or different subframes.

Further, the size of a subband corresponding to the subband CQI may be equal to or different from the size of a subband corresponding to the subband PMI. Preferably, the calculation of the subband CQI is based on the assumption that a precoding matrix of each RB of the subband corresponding to the subband PMI is used on each RB of the corresponding subband and on the assumption that and transmission is performed on the subband corresponding to the subband CQI, this feature may be applied to a case that the size of the subband corresponding to the subband CQI is different from the size of the subband corresponding to the subband PMI. For example, if RBs included in a subband S1 corresponding to the subband CQI are, in order, RB4, RB5, RB6, RB7; RBs included in a subband S2 corresponding to the subband CQI are, in order, RB7, RB8, RB9; a subband S3 corresponding to the subband PMI includes 5 RBs (it is assumed that they are RB1, RB2, RB3, RB4 and RB5), and it is assumed that transmission is performed on the subband corresponding to the subband CQI, then each resource block of the subband corresponding to the subband CQI may use the precoding matrix indicated by the subband PMI corresponding to the subband to which the resource block belongs, for example, on RB4 of the subband S1 corresponding to the subband CQI, the precoding matrix on RB4 of the subband corresponding to the subband PMI may be used.

Further, the subband CQI may be calculated for multiple transmission codewords, and the subband CQI of different codewords may be differentially encoded relative to the subband CQI of other codewords. For example, there are two codewords, CW0 and CW1, and the subband CQI of CW1 is differentially encoded relative to the subband CQI of CW0.

In the method for acquiring the channel quality indicator of the embodiments of the present invention, there is an overlapped resource block (RB) between adjacent subbands, and meanwhile the channel quality of the resource block of the subband, especially the channel quality of the resource block in the overlapped area of the subband, is obtained by using different subbands, thus the feedback accuracy of the channel quality of the resource block of each subband, especially the channel quality of the resource block in the subband overlapping area, thereby improving the granularity of frequency-selective scheduling, and improving the frequency-selective scheduling and the link adaptation, and therefore, the system throughput is increased.

Figure 6:
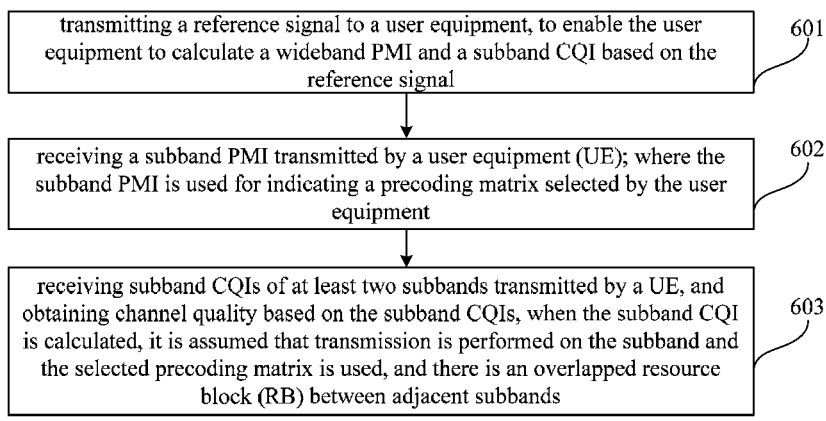
FIG. 6 is a flowchart of a method for acquiring a channel quality indicator according to a sixth embodiment of the present invention.

FIG. 6 is a flowchart of a method for acquiring a channel quality indicator according to a sixth embodiment of the present invention, as shown in FIG. 6, the method in this embodiment particularly includes the steps as follows:

step 601, transmitting a reference signal to a user equipment, to enable the user equipment to calculate a wideband PMI and a subband CQI based on the reference signal.

Specifically, the reference signal transmitted by the eNB may include a CSI RS or a CRS or a DM RS. The eNB may notify the user equipment of the transmitted reference signal via signaling such as an RRC signaling or downlink control information (DCI), or transmit the reference signal on a resource of the reference signal based on the cell identification (ID).

Specifically, the eNB may include a common base station, a relay, a transmitting point, an access point or a receiving point, and etc.

The user equipment calculates the subband PMI and the subband CQI based on the reference signal, as described in the fifth embodiment.

Further, the reference signal may also be used for enabling the user equipment to calculate the subband CQI based on the reference signal, as described in the third embodiment.

Step 602, receiving a subband PMI transmitted by a user equipment (UE); where the subband PMI is used for indicating a precoding matrix selected by the user equipment, and the precoding matrix is selected based on the reference signal and on the assumption that transmission is performed on the subband.

Specifically, the subband PMI may include one or more index values.

Step 603, receiving subband CQIs of at least two subbands transmitted by a UE, and obtaining channel quality based on the subband CQIs, when the subband CQI is calculated, it is assumed that transmission is performed on the subband and the selected precoding matrix is used, and there is an overlapped resource block (RB) between adjacent subbands.

Further, the step 603 may also include receiving the wideband CQI transmitted by the user equipment; at this time, the receiving the subband CQI transmitted by the user equipment may specifically be: receiving differential encoding of the subband CQI relative to the wideband CQI transmitted by the user equipment. The eNB can obtain the subband CQI based on the predefined differential encoding by utilizing the received wideband CQI and the received differential encoding of the subband CQI relative to the wideband CQI.

The eNB obtains channel quality, such as SINR or a modulation order or an encoding mode or a code rate or a transport block size or a combination thereof, according to the subband CQI or the wideband CQI and the differential encoding of the subband CQI relative to the wideband CQI, as described in step 202 in the second embodiment. The differential encoding can make full use of frequency domain relevance of the channel, thereby reducing feedback overhead.

Specifically, there is an overlapped resource block (RB) between adjacent subbands. For example, RBs included in a sunband S1 corresponding to subband CQI1 are, in order, RB1, RB2, RB3, RB4; RBs included in a subband S2 corresponding to subband CQI2 are, in order, RB4, RB5, RB6, RB7; based on subband CQI1, the eNB can acquire SINR1 of RB1, RB2, RB3 and RB4 based on the mapping between SINR and CQI, and based on subband CQI2, the eNB can acquire SINR2 of RB4, RB5, RB6 and RB7 based on the mapping between SINR and CQI. Since there is an overlapped RB, i.e., RB4 between subbands corresponding to subband CQI1 and subband CQI2, the eNB can acquire a more accurate SINR3 of RB4 based on SINR 1 and SINR2, for example, SINR3=(SINR1+SINR2)/2, then SINR3 corresponding to RB4 has a higher accuracy than SINR1 and SINR2. Meanwhile, RB4 has an SINR value which is different from that of RB1, RB2, RB3, also different from that of RB5, RB6, RB7, thereby increasing the granularity of frequency selectivity scheduling.

Specifically, in step 602 and step 603, the eNB can receive a wideband PMI, a subband CQI or a wideband CQI and differential encoding of the subband CQI relative to the wideband CQI transmitted by a user equipment UE through receiving a PUCCH or a PUSCH channel. The wideband PMI, the subband CQI or the wideband CQI and the differential encoding of the subband CQI relative to the wideband CQI may be received on the same or different subframes.

In the method for acquiring the channel quality indicator according to embodiments of the present invention, there is an overlapped resource block between adjacent subbands, and meanwhile the channel quality of the resource block of the subband, especially the channel quality of the resource block in the overlapped area of the subband, is obtained by using different subbands, thus the feedback accuracy of the channel quality of the resource block of each subband, especially the channel quality of the resource block in the subband overlapping area, thereby improving the granularity of frequency-selective scheduling, and improving the frequency-selective scheduling and the link adaptation. In addition, the division of overlapped area and non-overlapped area further improves the granularity of the CQI which can be distinguished by the frequency domain, and thereby further improving the granularity of scheduling. Accordingly, the granularity of multi-user pairing during MU-MIMO transmission can be improved, and thereby improving the system throughput.

Figure 7:
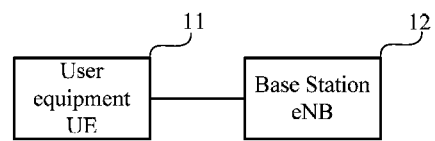
FIG. 7 is a schematic structural diagram of a system for acquiring a channel quality indicator according to an embodiment of the present invention.

FIG. 7 is a schematic structural diagram of a system for acquiring a channel quality indicator according to an embodiment of the present invention. The system in embodiments of the present invention includes a user equipment UE 11 and an eNB 12. Please refer to FIG. 8 and FIG. 10 for the structure of the user equipment UE 11 and refer to FIG. 9 and FIG. 11 for the structure of the eNB 12. Specifically, the user equipment UE 11 and the eNB 12 are as described in embodiments as follows.

Figure 8:
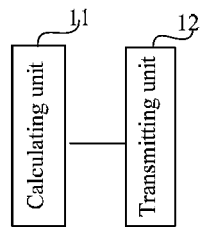
FIG. 8 is a schematic diagram of a user equipment UE according to an embodiment of the present invention.

FIG. 8 is a schematic diagram of a user equipment (UE) according to an embodiment of the present invention, as shown in FIG. 8, the user equipment for acquiring a channel quality indicator particularly includes a calculating unit 11 and a transmitting unit 12.

The calculating unit 11 is configured to calculate subband channel quality indicators (CQIs) of at least two subbands, where there is an overlapped resource block between the subbands;

The transmitting unit 12 is configured to transmit the subband CQIs to an evolved node B eNB, where the subband CQIs are used for enabling the eNB to obtain channel quality based on the subband CQIs.

Figure 10:
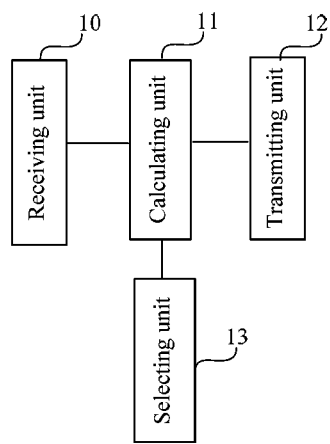
FIG. 10 is a schematic diagram of a user equipment UE according to another embodiment of the present invention.

In addition, FIG. 10 is another schematic diagram of a user equipment (UE) according to an embodiment of the present invention, as shown in FIG. 10, the UE in this embodiment can include a receiving unit 10 and a selecting unit 13.

The receiving unit is configured to receive a reference signal transmitted by an eNB;

Specifically, the reference signal transmitted by the eNB may include a CSI RS or a CRS or a DM RS. The user equipment (UE) may obtain the reference signal through receiving a notification of the eNB, such as an RRC signaling or downlink control information (DCI), or based on the cell identification (ID).

The calculating unit 11 is configured to calculate a subband channel quality indicator (CQI) based on the reference signal;

When calculating the subband CQI, assume that transmission is performed on the subband, and there is an overlapped resource block (RB) between adjacent subbands.

Specifically, a channel measurement value can be obtained based on the reference signal, such as a CSI RS or a CRS. The obtaining the subband CQI based on the channel measurement value is as described in step 101 of the first embodiment.

Further, the calculating unit is further configured to calculate a wideband channel quality indicator (CQI) based on the reference signal; when calculating the wideband CQI, assuming that transmission is performed on the system bandwidth;

Specifically, the above calculation process is as described in the first embodiment.

The selecting unit 13 is configured to select a precoding matrix based on the reference signal on condition that transmission is performed on a system bandwidth. The calculating unit calculates the subband CQI on condition that the selected precoding matrix is used and transmission is performed on the subband. The transmitting unit is configured to transmit a wideband precoding matrix indicator (PMI) to the eNB, where the wideband PMI corresponds to the selected precoding matrix. The calculating unit is configured to calculate a subband channel quality indicator (CQI) based on the reference signal; when calculating the subband CQI, assume that transmission is performed on the subband and assume that the selected precoding matrix is used, and there is an overlapped resource block between adjacent subbands.

Further, the calculating unit is configured to select the precoding matrix based on the reference signal on condition that transmission is performed on the subband; the transmitting unit is configured to transmit a subband precoding matrix indicator (PMI) to the eNB, where the subband PMI corresponds to the selected precoding matrix, and is used for calculating a wideband channel quality indicator (CQI) based on the reference signal; when calculating the wideband CQI, assume that the selected precoding matrix is used on the system bandwidth and assume that transmission is performed on the system bandwidth.

Specifically, the above calculation process is as described in the third embodiment.

Or, the selecting unit 13 may be configured to select the precoding matrix based on the reference signal, when selecting the precoding matrix, it is assumed that transmission is only performed on the subband; the calculating unit is configured to calculate the subband CQI on condition that the selected precoding matrix is used and transmission is performed on the subband; the transmitting unit is configured to transmit a subband precoding matrix indicator (PMI) to the eNB, where the subband PMI corresponds to the selected precoding matrix.

Further, the calculating unit may be further configured to calculate a wideband channel quality indicator (CQI) based on the reference signal; when calculating the wideband CQI, it is assumed that the selected precoding matrix is used on each subband and transmission is performed on the system bandwidth;

Specifically, the above calculation process is as described in the fifth embodiment.

The transmitting unit 12 is configured to transmit the subband CQIs to the eNB, to enable the eNB to acquire channel quality based on the subband CQI.

Specifically, the transmitting unit may transmit the subband CQI to the eNB through a physical uplink control channel (Physical Uplink Control Channel, PUCCH) or a physical uplink shared channel (Physical Uplink Shared Channel, PUSCH in short).

Further, the transmitting unit is further configured to transmit the wideband CQI to the eNB;

at this time, the transmitting the subband CQI to the eNB may specifically be: transmitting differential encoding of the subband CQI relative to the wideband CQI to the eNB.

Or, the transmitting unit may be further configured to transmit a wideband precoding matrix indicator (PMI) to the eNB, where the wideband PMI corresponds to the selected precoding matrix;

further, the transmitting unit may be further configured to transmit the wideband CQI to the eNB;

at this time, the transmitting the subband CQI to the eNB may specifically be: transmitting differential encoding of the subband CQI relative to the wideband CQI to the eNB.

The wideband CQI and the subband CQI are calculated based on the selected precoding matrix or the wideband PMI.

Or, the transmitting unit may be further configured to transmit a subband precoding matrix indicator (PMI) to the eNB, where the subband PMI corresponds to the precoding matrix selected on the subband.

Further, the transmitting unit is further configured to transmit the wideband CQI to the eNB;

at this time, the transmitting the subband CQI to the eNB may specifically be: transmitting differential encoding of the subband CQI relative to the wideband CQI to the eNB.

The wideband CQI and the subband CQI are calculated based on the precoding matrix selected on each subband or the subband PMI;

The eNB obtains channel quality, such as an SINR or a modulation order or an encoding means or a code rate or a transport block size or a combination thereof, based on the subband CQI or the wideband CQI and the differential encoding of the subband CQI relative to the wideband CQI, as described in step 202 in the second embodiment.

Specifically, there is an overlapped resource block (RB), i.e., the same RB between adjacent subbands. For example, one overlapped RB or two overlapped RBs. For example, the system bandwidth consists of 9 RBs, RBs included in a sunband S1 are, in order, RB1, RB2, RB3, RB4; RBs included in a subband S2 are, in order, RB4, RB5, RB6, RB7; RBs included in a subband S3 are, in order, RB7, RB8, RB9. The same RB included in the subbands S1 and S2 is RB4, and the same RB included in the subbands S2 and S3 is RB7.

Specifically, the transmitting unit may transmit a wideband PMI, a subband CQI or a wideband CQI and differential encoding of the subband CQI relative to the wideband CQI via a PUCCH or a PUSCH. The wideband PMI, the subband CQI or the wideband CQI and the differential encoding of the subband CQI relative to the wideband CQI may be transmitted on the same or different subframes.

Further, a size of the subband corresponding to the subband CQI is equal to or different from a size of the subband corresponding to the subband PMI. The calculation of the subband CQI is based on the assumption that a precoding matrix of each RB of the subband corresponding to the subband PMI is used on each RB of the corresponding subband and on the assumption that and transmission is performed on the subband corresponding to the subband CQI.

In the user equipment (UE) of embodiments of the present invention, there is an overlapped resource block (RB) between adjacent subbands, and meanwhile the channel quality of the resource block of the subband, especially the channel quality of the resource block in the overlapped area of the subband, is obtained by using different subbands, thus the feedback accuracy of the channel quality of the resource block of each subband, especially the channel quality of the resource block in the subband overlapping area, thereby improving the granularity of frequency-selective scheduling, and improving the frequency-selective scheduling and the link adaptation, and therefore, the system throughput is increased.

Figure 9:
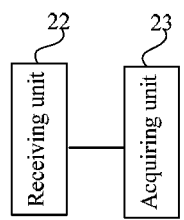
FIG. 9 is a schematic diagram of an eNB according to an embodiment of the present invention.

FIG. 9 is a schematic diagram of an eNB according to an embodiment of the present invention, as shown in FIG. 9, the eNB for acquiring a channel quality indicator particularly includes a receiving unit 22 and an acquiring unit 23.

The receiving unit 22 is configured to receive subband CQIs of at least two subbands transmitted by a user equipment, where there is an overlapped resource block between the subbands; the acquiring unit 23 is configured to acquire channel quality based on the subband CQIs.

Particularly, the acquiring unit may be configured to obtain the channel quality of the overlapped resource block according to a subband CQI of a first subband and a subband CQI of a second subband, in case that the overlapped resource block is located in the first subband and the second subband of the at least two subbands. For example, obtain first channel quality information of the overlapped resource block and second channel quality information of the overlapped resource block respectively according to the subband CQI of the first subband and the subband CQI of the second subband, and select one of the first channel quality information and the second channel quality information to be channel quality of the overlapped resource block.

Preferably, the acquiring unit may be configured to obtain the channel quality of the overlapped resource block according to a functional relationship among the subband CQI of the first subband, the subband CQI of the second subband and the channel quality of the overlapped resource block.

Preferably, the acquiring unit may be further configured to obtain first channel quality information of the overlapped resource block according to the subband CQI of the first subband, obtain second channel quality information of the overlapped resource block according to the subband CQI of the second subband, and obtain the channel quality of the overlapped resource block by averaging the first channel quality information and the second channel quality information.

Figure 11:
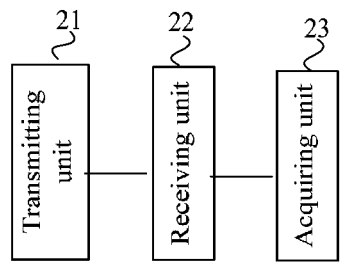
FIG. 11 is a schematic diagram of an eNB according to another embodiment of the present invention.

FIG. 11 is another schematic diagram of an eNB according to an embodiment of the present invention, as shown in FIG. 11, the eNB in this embodiment may also include a transmitting unit 21, configured to transmit a reference signal to the user equipment, to enable the user equipment to calculate the subband CQI based on the reference signal.

Specifically, the reference signal transmitted by the eNB may include a CSI RS or a CRS or a DM RS. The eNB may notify the user equipment of the transmitted reference signal through a signaling such as an RRC signaling or downlink control information (DCI), or transmit the reference signal on a resource of the reference signal based on the cell identification (ID).

The calculating the CQI or the wideband PMI or the subband PMI or the wideband CQI by the user equipment based on the reference signal is as described in the first embodiment, the third embodiment, the fifth embodiment or the embodiment with reference to FIG. 8, and no details will be given here.

The receiving unit 22 is configured to receive the subband CQI transmitted by the user equipment, and obtain channel quality based on the subband CQI, when calculating the subband CQI, it is assumed that transmission is performed on the subband, and there is an overlapped resource block (RB) between adjacent subbands.

Specifically, the receiving unit may receive the subband CQI transmitted by the user equipment UE via a physical uplink control channel (Physical Uplink Control Channel, PUCCH) or a physical uplink shared channel (Physical Uplink Shared Channel, PUSCH in short).

Further, the receiving unit is also configured to receive the wideband CQI transmitted by the user equipment and receive differential encoding of the subband CQI relative to the wideband CQI transmitted by the user equipment; the bandwidth CQI is calculated by the user equipment based on the reference signal, and on condition that the selected precoding matrix is used on a system bandwidth and transmission is performed on the system bandwidth.

Or, the receiving unit is further configured to receive a wideband precoding matrix indicator (PMI) transmitted by the user equipment, where the PMI corresponds to the precoding matrix selected by the user equipment. The channel quality is obtained based on the subband CQI, where when the subband CQI, it is assumed that transmission is performed on the subband and assumed that the selected precoding matrix is used, and there is an overlapped resource block (RB) between adjacent subbands;

Further, the receiving unit is further configured to receive a wideband CQI transmitted by the user equipment and receive differential encoding of the subband CQI relative to the wideband CQI transmitted by the user equipment, where the wideband CQI is calculated by the user equipment based on the reference signal on condition that transmission is performed on the system bandwidth.

Or, the receiving unit is further configured to receive a subband precoding matrix indicator (PMI) transmitted by the user equipment, where the subband PMI corresponds to the selected precoding matrix. The channel quality is obtained based on the subband CQI, where when calculating the subband CQI, it is assumed that transmission is performed on the subband and assumed that the selected precoding matrix is used, and there is an overlapped resource block (RB) between adjacent subbands;

Further, the receiving unit may be further configured to receive a wideband CQI transmitted by the user equipment; at this time, the receiving the subband CQI transmitted by the user equipment may specifically be: receiving differential encoding of the subband CQI relative to the wideband CQI transmitted by the user equipment. The eNB may obtain the subband CQI based on the predefined differential encoding by utilizing the received wideband CQI and the received differential encoding of the subband CQI relative to the wideband CQI.

The eNB obtains channel quality, such as SINR or a modulation order or an encoding means or a code rate or a transport block size or a combination thereof, based on the subband CQI or the wideband CQI and the differential encoding of the subband CQI relative to the wideband CQI, as described in step 202 in the second embodiment. The differential encoding can make full use of frequency domain relevance of the channel, thereby reducing feedback overhead.

Specifically, there is an overlapped resource block (RB) between adjacent subbands, for example, one overlapped RB or two overlapped RBs. For example, the system bandwidth consists of 9 RBs, RBs included in a sunband S1 are, in order, RB1, RB2, RB3, RB4; RBs included in a subband S2 corresponding to the subband CQI are, in order, RB4, RB5, RB6, RB7; RBs included in a subband S3 corresponding to the subband CQI are, in order, RB7, RB8, RB9; where, the same RB included in the subbands S1 and S2 is RB4, and the same RB included in the subbands S2 and S3 is RB7.

In the eNB of embodiments of the present invention, there is an overlapped resource block (RB) between adjacent subbands, and meanwhile the channel quality of the resource block of the subband, especially the channel quality of the resource block in the overlapped area of the subband, is obtained by using different subbands, thus the feedback accuracy of the channel quality of the resource block of each subband, especially the channel quality of the resource block in the subband overlapping area, thereby improving the granularity of frequency-selective scheduling, and improving the frequency-selective scheduling and the link adaptation, and therefore, the system throughput is increased.

Persons skilled in the art would appreciate that the various illustrative units and algorithm steps described in connection with the embodiments disclosed herein may be implemented as electronic hardware, computer software, or a combination of both. To clearly illustrate this interchangeability of hardware and software, various illustrative components and steps have been described above generally in terms of their functionality. Whether such functionality is implemented as hardware or software depends on particular applications and design restrictions of the technical solutions. Professional technicians may implement the described functions in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. The software module may reside in a random access memory (RAM), internal memory, read-only memory (ROM), electrically programmable ROM, electrically erasable programmable ROM, register, hard disk, removable disk, CD-ROM, or any other form of storage medium known in the art.

The objectives, technical solutions, and beneficial effects of the present invention have been described in further detail through the above specific embodiments. It should be understood that the above descriptions are merely specific embodiments of the present invention, but not intended to limit the protection scope of the present invention. Any modification, equivalent replacement, or improvement made under the spirit and principles of the present invention is included in the scope of the present invention.

What is claimed is:

1. A method for acquiring a channel quality indicator (CQI), comprising:
   determining, by a calculating unit of a user equipment (UE), subband CQIs of at least two subbands, wherein there are one or two overlapped resource blocks between a first subband and a second subband of the subbands, and the first subband and the second subband are adjacent subbands;
   transmitting, by a transmitting unit of the UE, the subband CQIs to an evolved node B (eNB), to enable the eNB to obtain channel quality of the overlapped resource blocks according to a functional relationship among the subband CQI of the first subband, the subband CQI of the second subband and the channel quality of the overlapped resource blocks.

2. The method according to claim 1, wherein determining the subband CQIs of the at least two subbands, comprises:
   receiving, by a receiving unit of the UE, a reference signal transmitted by the eNB;
   calculating, by the calculating unit, the subband CQIs based on the reference signal.

3. The method according to claim 2, further comprising:
   selecting, by a selecting unit of the UE, a precoding matrix based on the reference signal on condition that transmission is performed on a system bandwidth;
   wherein determining the subband CQIs of the at least two subbands comprises: determining the subband CQIs on condition that the selected precoding matrix is used and the transmission is performed on the subbands;
   transmitting, by the transmitting unit, a wideband precoding matrix indicator (PMI) to the eNB, wherein the wideband PMI corresponds to the selected precoding matrix.

4. The method according to claim 2, further comprising:
   selecting, by a selecting unit of the UE, a precoding matrix based on the reference signal on condition that transmission is performed on a subband;
   wherein determining the subband CQIs of the at least two subbands comprises: determining the subband CQIs on condition that the selected precoding matrix is used and the transmission is performed on the subbands;

transmitting, by the transmitting unit, a subband precoding matrix indicator (PMI) to the eNB, wherein the subband PMI corresponds to the selected precoding matrix.

5. The method according to claim 4, wherein a size of the subband corresponding to one of the subband CQIs is equal to or different from a size of the subband corresponding to the subband PMI.

6. The method according to claim 4, wherein determining the subband CQIs on condition that the selected precoding matrix is used and the transmission is performed on the subbands further comprises: determining the subband CQIs on condition that the precoding matrix on each resource block of the subband corresponding to the subband PMI is used on each resource block of a subband corresponding to one of the subband CQIs, and the transmission is performed on the subband corresponding to the subband CQI.

7. A method for acquiring a channel quality indicator (CQI), comprising:
receiving, by a receiving unit of an evolve node B (eNB), subband CQIs of at least two subbands transmitted by a user equipment, wherein there are one or two overlapped resource blocks between a first subband and a second subband of the subbands, and the first subband and the second subband are adjacent subbands;
obtaining, by an acquiring unit of the eNB, channel quality of the overlapped resource blocks according to a functional relationship among the subband CQI of the first subband, the subband CQI of the second subband and the channel quality of the overlapped resource blocks.

8. The method according to claim 7, wherein obtaining the channel quality of the overlapped resource block according to the functional relationship among the subband CQI of the first subband, the subband CQI of the second subband and the channel quality of the overlapped resource block, comprises:
obtaining first channel quality information of the overlapped resource block according to the subband CQI of the first subband;
obtaining second channel quality information of the overlapped resource block according to the subband CQI of the second subband;
obtaining the channel quality of the overlapped resource block by averaging the first channel quality information and the second channel quality information.

9. The method according to claim 7, wherein receiving the subband CQI of the at least two subbands transmitted by the user equipment, comprises:
receiving a wideband CQI transmitted by the user equipment and receiving differential encoding of the subband CQI relative to the wideband CQI transmitted by the user equipment.

10. A user equipment, comprising:
a calculating unit, configured to determine subband channel quality indicators (CQIs) of at least two subbands, wherein there are one or two overlapped resource blocks between a first subband and a second subband of the subbands and the first subband and the second subband are adjacent subbands;
a transmitting unit, configured to transmit the subband CQIs to an evolved node B (eNB), to enable the eNB to obtain channel quality of the overlapped resource blocks according to a functional relationship among the subband CQI of the first subband, the subband CQI of the second subband and the channel quality of the overlapped resource blocks.

11. The user equipment according to claim 10, further comprising a receiving unit, configured to receive a reference signal transmitted by the eNB, wherein the calculating unit is configured to calculate the subband CQIs based on the reference signal.

12. The user equipment according to claim 11, further comprising:
a selecting unit, configured to select a precoding matrix based on the reference signal on condition that transmission is performed on a system bandwidth;
wherein the calculating unit is configured to determine the subband CQIs on condition that the selected precoding matrix is used and the transmission is performed on the subbands;
the transmitting unit is configured to transmit a wideband precoding matrix indicator (PMI) to the eNB, wherein the wideband PMI corresponds to the selected precoding matrix.

13. The user equipment according to claim 11, further comprising:
a selecting unit, configured to select a precoding matrix based on the reference signal on condition that transmission is performed on a subband;
wherein the calculating unit is configured to determine the subband CQIs on condition that the selected precoding matrix is used and the transmission is performed on the subbands;
the transmitting unit is configured to transmit a subband precoding matrix indicator (PMI) to the eNB, wherein the subband PMI corresponds to the selected precoding matrix.

14. The user equipment according to claim 13, wherein a size of the subband corresponding to the subband CQI is equal to or different from a size of the subband corresponding to the subband PMI.

15. An evolved node B (eNB), comprising:
a receiving unit, configured to receive subband channel quality indicators (CQIs) of at least two subbands transmitted by a user equipment, wherein there are one or two overlapped resource blocks between a first subband and a second subband of the subbands, and the first subband and the second subband are adjacent subbands;
an acquiring unit, configured to obtain channel quality of the overlapped resource blocks according to a functional relationship among the subband CQI of the first subband, the subband CQI of the second subband and the channel quality of the overlapped resource blocks.

16. The eNB according to claim 15, wherein:
the acquiring unit is configured to obtain first channel quality information of the overlapped resource block according to the subband CQI of the first subband, obtain second channel quality information of the overlapped resource block according to the subband CQI of the second subband, and obtain the channel quality of the overlapped resource block by averaging the first channel quality information and the second channel quality information.

17. The eNB according to claim 15, wherein the receiving unit is further configured to receive a wideband CQI transmitted by the user equipment and receive differential encoding of the subband CQI relative to the wideband CQI transmitted by the user equipment.

* * * * *

UNITED STATES PATENT AND TRADEMARK OFFICE
CERTIFICATE OF CORRECTION

PATENT NO. : 9,794,818 B2  
APPLICATION NO. : 14/593423  
DATED : October 17, 2017  
INVENTOR(S) : Zhou et al.

Page 1 of 1

It is certified that error appears in the above-identified patent and that said Letters Patent is hereby corrected as shown below:

On the Title Page

Title of Invention, "ACQUI+RING" should read -- ACQUIRING --

Signed and Sealed this
Nineteenth Day of December, 2017

Joseph Matal
*Performing the Functions and Duties of the
Under Secretary of Commerce for Intellectual Property and
Director of the United States Patent and Trademark Office*